(12) United States Patent
Belanger

(10) Patent No.: US 8,439,732 B2
(45) Date of Patent: May 14, 2013

(54) HVAC AIR VALVE

(75) Inventor: Brian Belanger, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 1079 days.

(21) Appl. No.: 12/416,069

(22) Filed: Mar. 31, 2009

(65) Prior Publication Data

US 2010/0248608 A1  Sep. 30, 2010

(51) Int. Cl.
*B60H 3/00* (2006.01)
(52) U.S. Cl.
USPC .............................. 454/156; 454/70; 454/161
(58) Field of Classification Search .................. 454/156, 454/70, 161
See application file for complete search history.

(56) References Cited

U.S. PATENT DOCUMENTS

| | | | |
|---|---|---|---|
| 4,531,671 A * | 7/1985 | Schwenk | 237/12.3 B |
| 6,482,081 B2 * | 11/2002 | Vincent et al. | 454/121 |
| 6,874,575 B2 * | 4/2005 | Kim | 165/204 |
| 6,959,754 B2 * | 11/2005 | Lee et al. | 165/42 |

* cited by examiner

*Primary Examiner* — John K Fristoe, Jr.
*Assistant Examiner* — Seth Faulb
(74) *Attorney, Agent, or Firm* — Harness, Dickey & Pierce, P.L.C.

(57) ABSTRACT

A passive air valve for an HVAC module allows air to flow through a conditioning passage in a single direction. The valve can be disposed on a downstream side of a heat exchanger. The valve can inhibit back airflow from one of the conditioning passages to the other one of the conditioning passages.

20 Claims, 9 Drawing Sheets

FIG 6
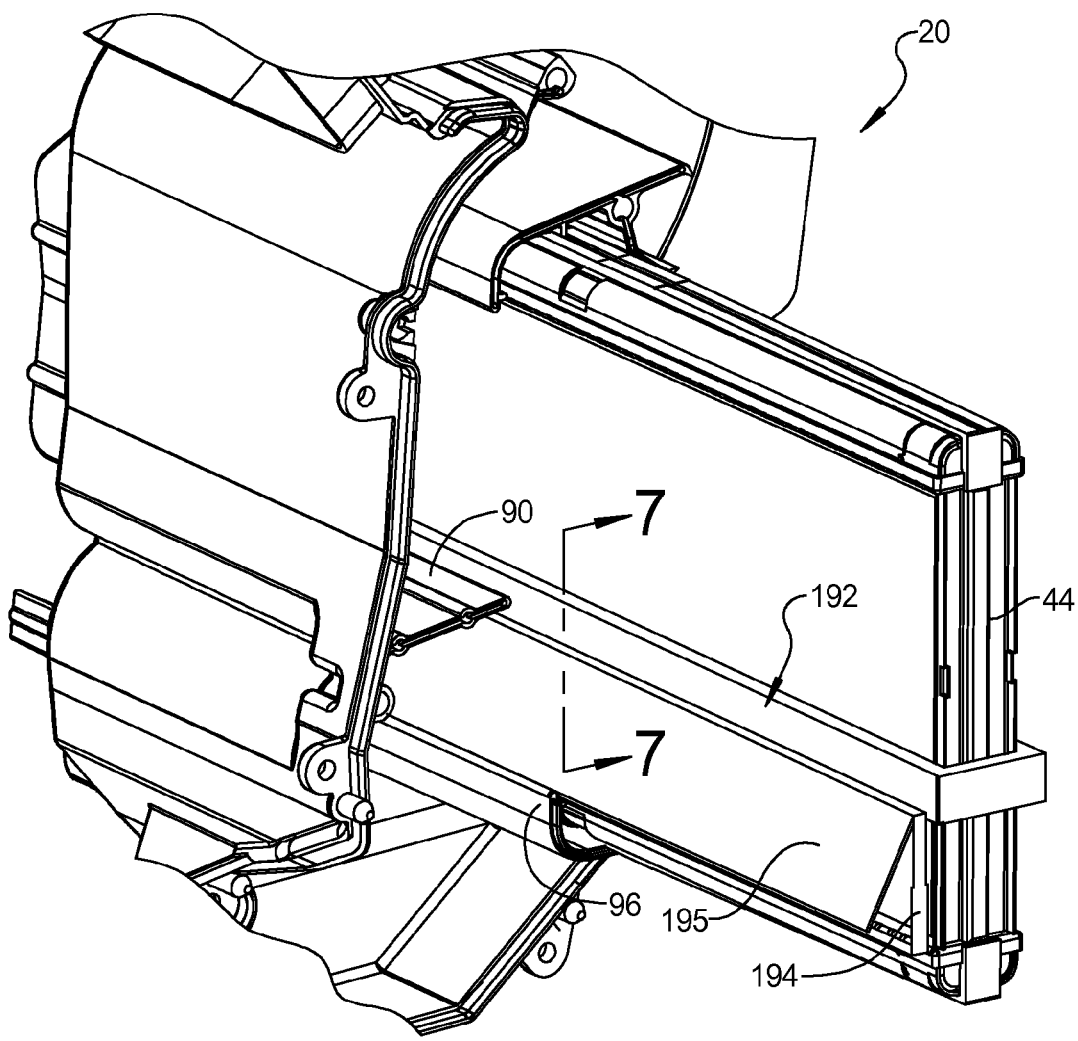
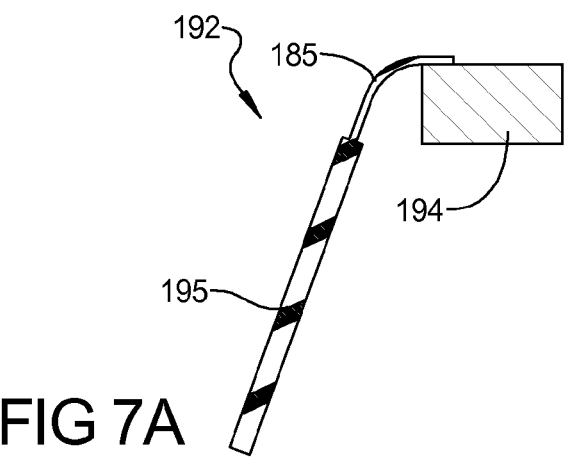
FIG 7A
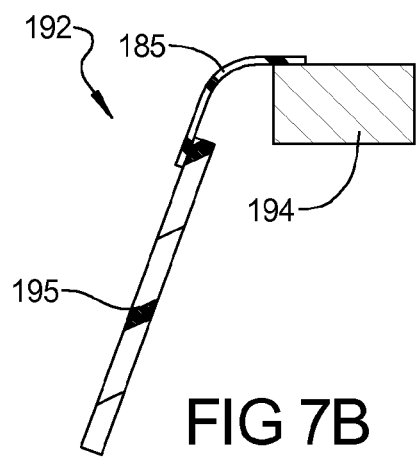
FIG 7B

FIG 10
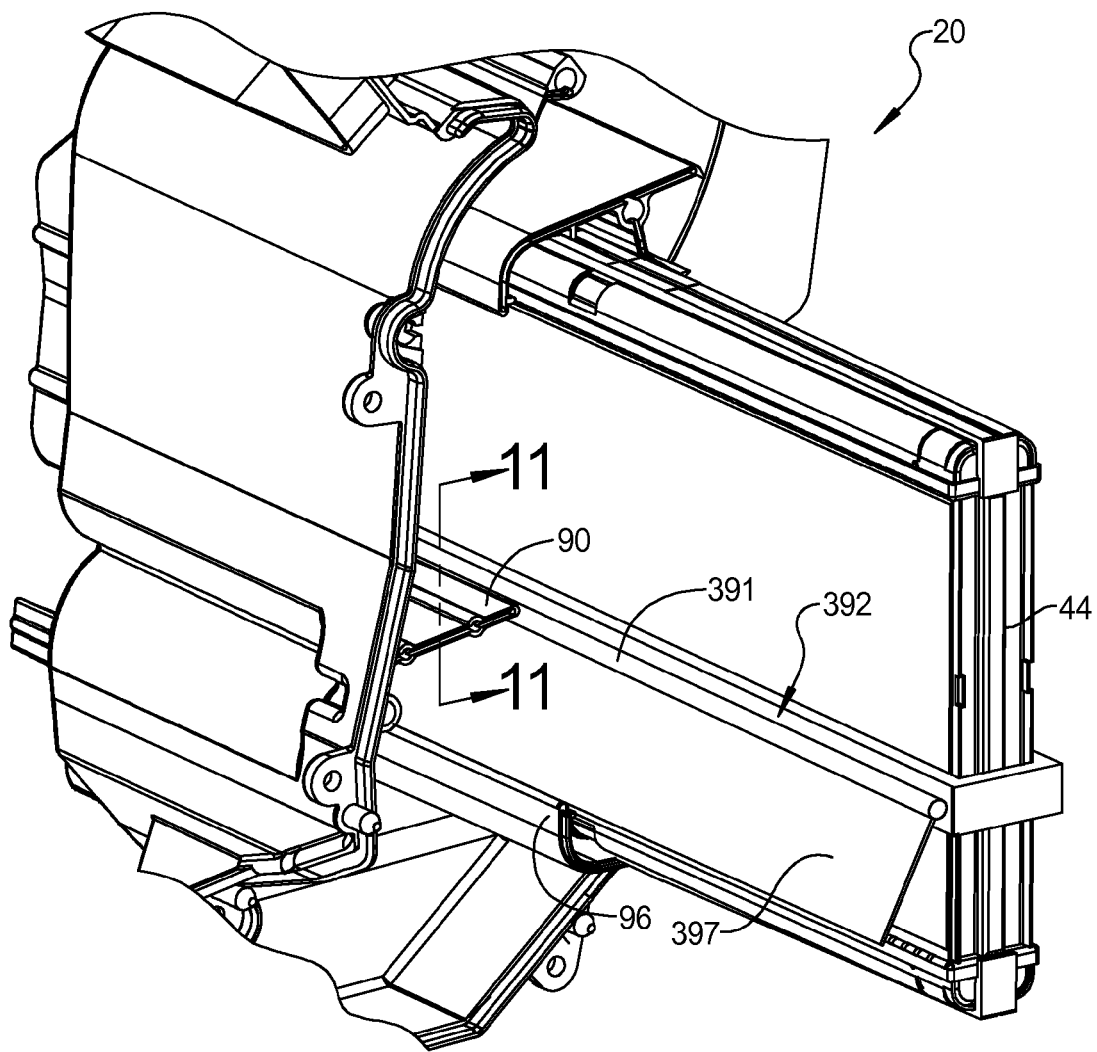
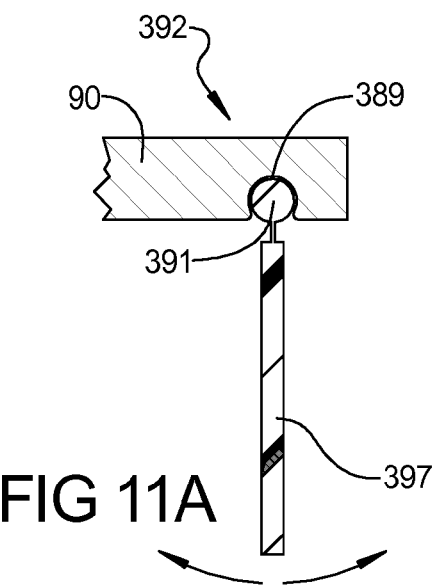
FIG 11A
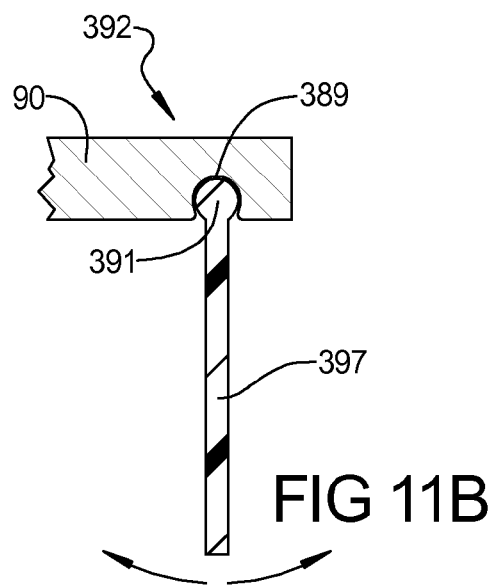
FIG 11B

HVAC AIR VALVE

FIELD

The present disclosure relates to HVAC modules and, more particularly, to an air valve used in an HVAC module.

BACKGROUND AND SUMMARY

This section provides background information related to the present disclosure which is not necessarily prior art. This section also provides a general summary of the disclosure, and is not a comprehensive disclosure of its full scope or all of its features.

HVAC modules can be utilized in automotive vehicles to provide conditioned air to various portions of the vehicle. For example, the HVAC module can allow for fresh air to be drawn in, or the recirculation of existing air, and can route that air across an evaporator to cool the air and/or a heater core to heat the air. The conditioned air can be routed to various locations in the passenger space of the vehicle. For example, the conditioned air can be routed to the front windshield, thereby providing a defrost function, can be routed out panel vents associated with the face area of the passenger space, or to the feet area of the passenger space and combinations thereof. Additionally, in some automotive vehicles, conditioned air may be supplied to a rear passenger space. The HVAC module may include only a single rear passageway allowing the flow of conditioned air to a single area of the rear passenger compartment or may include multiple passageways (or a partitioned passageway), allowing the conditioned air to be supplied to various locations, such as to the feet area, a body area, or a head area of the rear passenger space.

To control the various air flows through the HVAC module, mechanized doors with actuators and linkage assemblies can be utilized to control the direction of the airflow along with the partitioning of the airflow through the various passageways to provide a desired conditioned airstream to the desired areas of the passenger space. The use of mechanically actuated doors can provide positive positioning of the doors such that inadvertent or undesired airflows do not occur. However, the use of mechanically actuated doors requires a mechanism and an actuator which increases the cost of the HVAC module, along with its complexity. Thus, every use of an additional mechanically actuated door increases the cost of the HVAC module, along with its complexity. Accordingly, it would be desirable to reduce the number of mechanically actuated doors to reduce the cost and/or simplify the HVAC module.

Additionally, in some of the flow passages, air leaks can develop as a result of pressure differentials, resulting in airflow in undesired directions. The undesired airflow can take a variety of forms. For example, air from an airstream that is conditioned for the rear area may leak into the airstream conditioned for the front area due to a pressure differential and result in the air to the front area not being at the desired temperature or level of conditioning. Accordingly, it would be desirable to reduce the possibility of the various air passages cross-communicating due to pressure differentials. Furthermore, it would be advantageous if the prevention can be achieved by an economical or low cost solution.

A passive air valve for an HVAC module according to the present teachings allows air to flow through a conditioning passage in a single direction. The valve can be disposed on a downstream side of a heat exchanger that extends through at least two conditioning passages. The valve can inhibit back airflow from one of the conditioning passages to the other one of the conditioning passages. The valve does not require an actuator mechanism to economically inhibit the back airflow.

An HVAC module according to the present teachings includes a housing with an air supply passage and a blower operable to supply an air flow to the air supply passage. The housing also has an outlet passage in the housing and a conditioning passage in flow communication with the air supply passage and the outlet passage. A heat exchanger is located in the housing. There is an actively controlled door operable to selectively block flow communication between the air supply passage and the conditioning passage. There is a passive air valve allowing air to flow through the conditioning passage when originating from the air supply passage and inhibiting air from flowing through the conditioning passage when originating from the outlet passage.

An HVAC module according to the present teachings includes a housing having a main air supply passage, a first outlet passage, a first conditioning passage extending between the main air supply passage and the first outlet passage, a second outlet passage, a second conditioning passage extending between the main air supply passage and the second outlet passage, at least one first outlet communicating the first outlet passage for directing a first conditioned flow of air to a first location, and at least one second outlet communicating with the second outlet passage for directing a second conditioned flow of air to a second location different that the first location. A blower is operable to supply an air flow through the housing. A heater core is disposed in the housing and extends through both of the first and second conditioning passages. A first actively controlled door is operable to selectively block flow communication between the main air supply passage and the first conditioning passage. A second actively controlled door is operable to selectively block flow communication between the main air supply passage and the second conditioning passage. A passive air valve is disposed in the second conditioning passage on an opposite side of the heater core from the second door. The air valve allows air to flow through the heater core in the second conditioning passage when originating from the main air supply passage and inhibits air flow through the second conditioning passage when originating from the second outlet passage. The air valve thereby inhibits back airflow from the second conditioning passage to the first conditioning passage when the first and second doors block flow communication between the respective first and second conditioning passages and the main air supply passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is an enlarged fragmented perspective view of the driver case, heater core and a second embodiment of an air valve according to the present teachings;

FIGS. 7A and 7B are enlarged fragmented cross-sectional views along line 7-7 of FIG. 6;

FIG. 10 is an enlarged fragmented perspective view of the driver case, heater core and a fourth embodiment of an air valve according to the present teachings;

FIGS. 11A and 11B are enlarged fragmented cross-sectional views along line 11-11 of FIG. 10.

DETAILED DESCRIPTION

Figure 1:
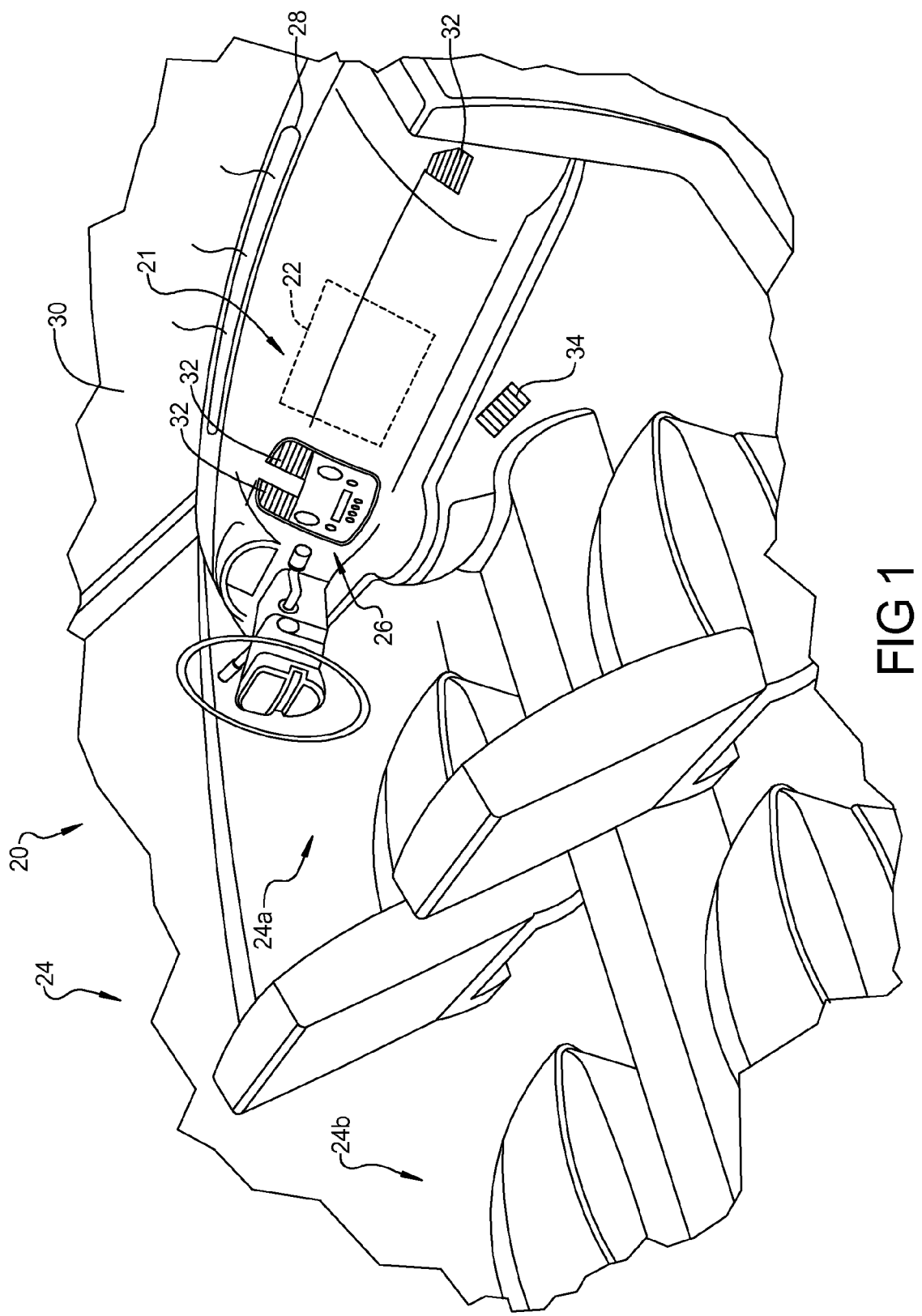
FIG. 1 is a fragmented perspective view of an automotive vehicle showing a portion of the passenger space.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Referring to FIG. 1, an automotive vehicle 20 with an HVAC system 21 within which an HVAC module 22 according to the present teachings can be utilized is shown. Vehicle 20 includes a passenger space 24 which may have both a front passenger space 24a and a rear passenger space 24b. HVAC controls 26 allow adjustment of the operation of HVAC module 22 to provide desired flows of conditioned air. Various outlets allow the conditioned air to flow to various portions of passenger space 24. By way of non-limiting example, the outlets can include a defrost outlet 28 adjacent a front windshield 30, face outlets 32 and feet outlets 34. Depending on the configuration and type of HVAC module 22 utilized, additional outlets can be included to allow conditioned air to flow directly to rear passenger space 24b (dual front and rear zone module). Also depending on the configuration and type of HVAC module 22 utilized, face outlets 32 and feet outlets 34 for the driver's area and passenger's area can receive the same conditioned airflow (single front zone module) or different conditioned airflows (dual front zone module).

Figure 2:
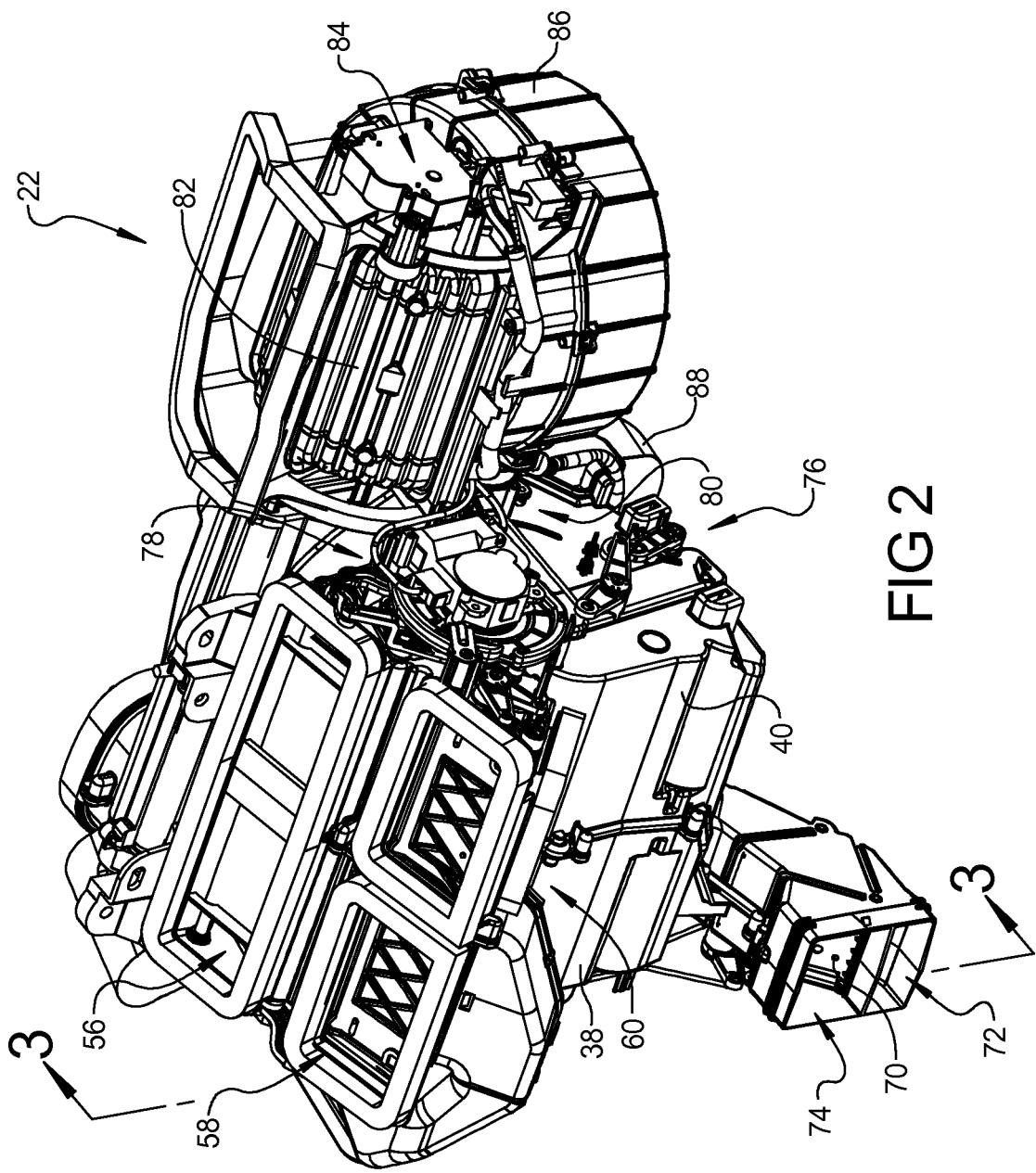
FIG. 2 is a perspective view of an exemplary HVAC module that can utilize an air valve according to the present teachings.
Figure 3:
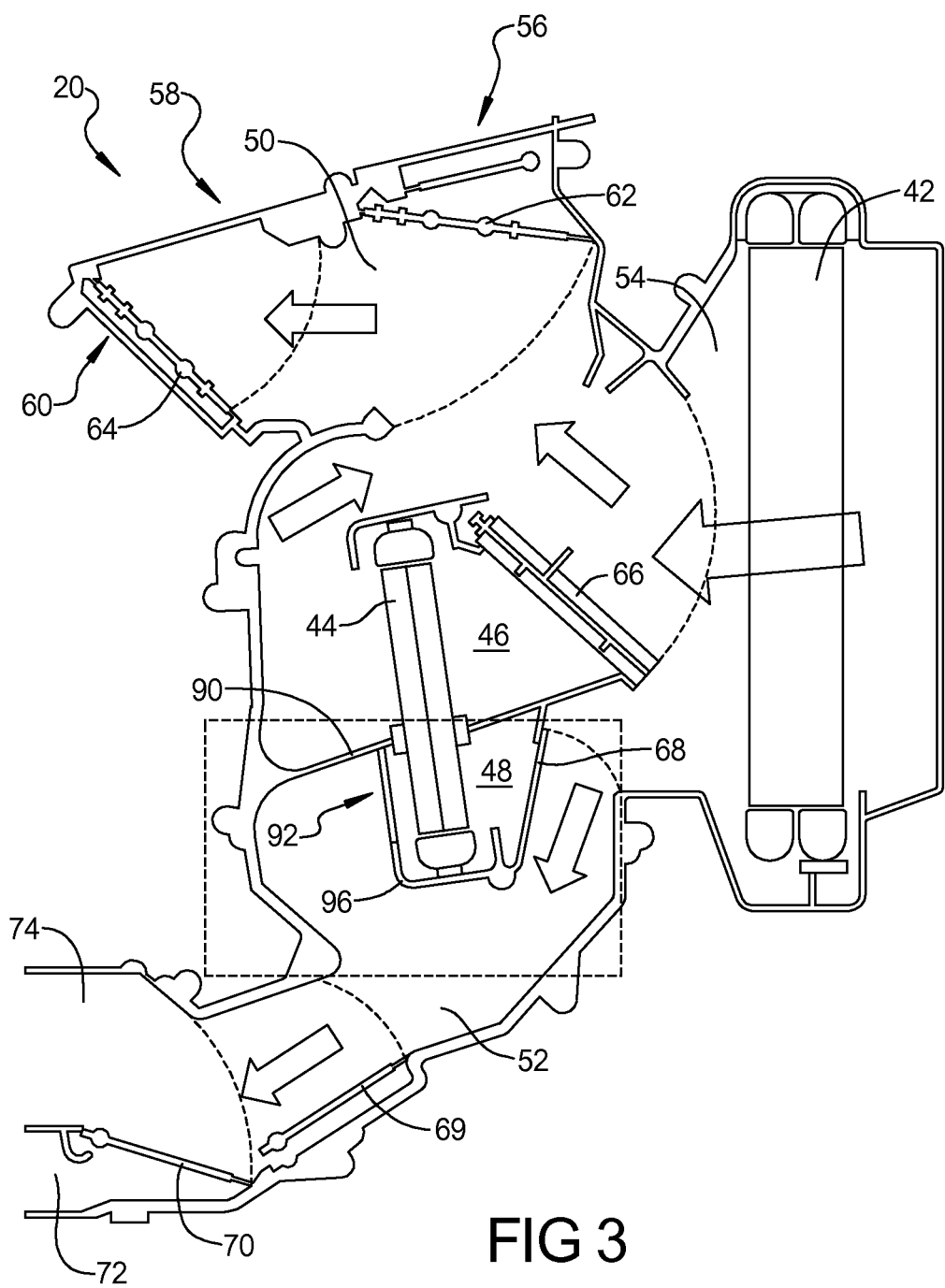
FIG. 3 is a simplified cross-sectional view of the HVAC module along line 3-3 of FIG. 2.

The HVAC controls 26 are generally used by the front passengers to control the temperature of the air discharged into the passenger space 24. Referring to FIGS. 1-3, HVAC module 22 is shown as a dual zone module that can provide separate conditioned airflows to the front driver and front passenger. The conditioned air flow for the rear passengers is based on the front passenger. For ease of understanding, at times the front driver and front passenger zones may be described with reference only to the front driver configuration. It should be appreciated that the front passenger configuration is similar to that shown and described for the front driver. HVAC module 22 includes driver and passenger cases 38, 40 that attach together and define internal flow passages (ducts) that provide desired conditioning and direct conditioned air to desired locations. HVAC module 22, in the configuration shown, can provide separate conditioned airflows to front passenger space 24a and rear passenger space 24b.

HVAC module 22 generally contains an evaporator 42, a heater core 44, a front hot air passage 46, a rear hot air passage 48, a front main passage 50, a rear main passage 52, and a main air supply passage 54. Front main passage 50 includes a defrost outlet 56 that communicates with defrost outlet 28, a face outlet 58 that communicates with face outlets 32, and a feet outlet 60 that communicates with feet outlets 34. A defrost door 62 can move between open and closed positions, and intermediate positions therebetween, to control the quantity of conditioned air flowing from front main passage 50 through defrost outlets 56, 28. A face door 64 can move between a first position blocking feet outlet 60 to a second position blocking face outlet 58, and intermediate positions therebetween, to control the quantity of conditioned air flowing from front main passage 50 through face outlets 58, 32 and feet outlets 60, 34. A front air mix door 66 can move between a first position blocking airflow from main air supply passage 54 to front hot air passage 46 and a second position blocking direct airflow from main air supply passage 54 to front main passage 50, and intermediate positions therebetween. Front air mix door 66 can thereby control the quantity of air reaching front main passage 50 directly from main air supply passage 54 and front hot air passage 46. A rear air mix door 68 can move between a first position blocking airflow from main air supply passage 54 to rear hot air passage 48 and a second position blocking direct airflow from main air supply passage 54 to rear main passage 52, and intermediate positions therebetween. Rear air mix door 68 can thereby control the quantity of air from main air supply passage 54 flowing to rear main passage 52 directly from main air supply passage 54 and from rear hot air passage 48. A rear upper/lower door 70 can move between a first position blocking a lower rear passage 72 and a second position blocking an upper rear passage 74, and intermediate positions therebetween. Rear upper/lower door 70 can thereby control the quantity of conditioned air flowing from rear main passage 52 to lower rear passage 72 and upper rear passage 74. Lower and upper rear passages 72, 74 can provide the conditioned airflow to respective upper and lower portions of rear passenger space 24b. A rear air supply door 69 can move between a first position allowing flow from rear main passage 52 into lower and/or upper rear passages 72, 74 to a second position blocking flow from rear main passage 52 flowing into lower and/or upper rear passages 72, 74 and intermediate positions therebetween. Rear air supply door 69 can thereby control the quantity of air from main air supply passage 54 to rear passenger space 24b.

HVAC module 22 includes various actuation mechanisms to control the operation of defrost door 62, face door 64, front air mix door 66, rear air mix door 68, rear air supply door 69, and rear upper/lower door 70. For example, as shown in FIG. 2, a linkage assembly 76 can be coupled to rear air mix door 68 and to an actuator mechanism 80 which is also coupled to front air mix door 66. Actuator mechanism 80 can thereby control operation and position of both front air mix door 66 and rear air mix door 68. Similarly, an actuator linkage assembly 78 can be coupled to and control operation of defrost door 62, face door 64, rear upper/lower door 70 and rear air supply door 69. It should be appreciated that in a dual front zone HVAC module, there may be two actuator mechanisms to control two separate front air mix doors—one for the driver and one for the passenger.

HVAC module 22 also includes a fresh air/recirculation door 82 and an actuator mechanism 84 operable to move fresh air/recirculation door 82. Movement of fresh air/recirculation door 82 controls the type of air provided to main air supply passage 54 by a variable-speed blower 86. A blower controller 88 controls operation of a motor driving blower 86. Operation of HVAC controls 26 can control the operation of the various doors, actuators, and blower to provide the desired flow of conditioned air to the desired locations.

Evaporator 42 is located in main air supply passage 54 such that airflow generated by blower 86 flows through evaporator 42. Depending upon the operating condition of an AC compressor (not shown), the air flowing across evaporator 42 will be cooled (when the AC compressor is active) or remain substantially unchanged (when the AC compressor is off). Heater core 44 has coolant from the engine flowing therethrough and is located in both front hot air passage 46 and rear hot air passage 48. A partition 90 separates front and rear hot air passages 46, 48 with heater core 44 extending through an opening therein. To cool passenger space 24, the air conditioning compressor is invoked to cool the air flowing across evaporator 42. Simultaneously, the front and rear air mix doors 66, 68 can be adjusted to block airflow from main air supply passage 54 through respective front and rear hot air passages 46, 48 (full cold) or to allow some flow therethrough (less than full cold operation). When heating of passenger space 24 is desired front and rear air mix doors 66, 68 can be adjusted to control the quantity of air from main air supply passage 54 flowing across heater core 44 to provide the desired flows of conditioned air to respective front and rear passenger spaces 24a, 24b.

Figure 12:
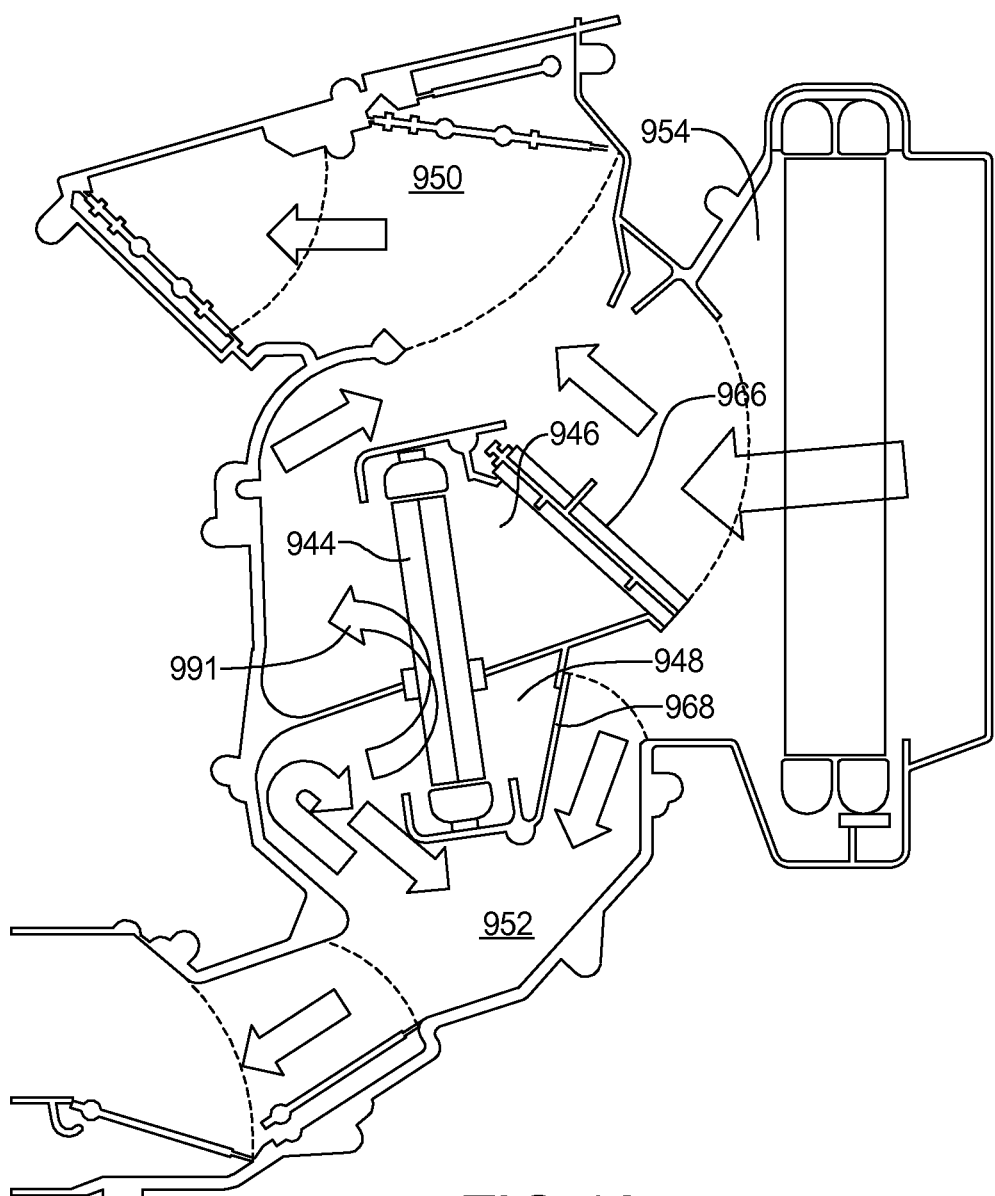
FIG. 12 is a view of the HVAC module of FIG. 3 with the air valve removed illustrating the cross-communication of the different conditioned airflows.

Referring now to FIG. 12, operation of an HVAC module without an air valve according to the present teachings is shown operating in a full cold mode. As can be seen, the front and rear air mix doors 966, 968 are in positions associated with blocking all flow from main air supply passage 54 into front and rear hot air passages 946, 948. However, as a result of a pressure differential between front main passage 950 and rear main passage 952, some of the airflow through rear main passage 952 may backflow into rear hot air passage 948 and flow into front hot air passage 946, as shown by back airflow 991. The back airflow 991 can be eddy currents. The back airflow 991 can flow through or in direct contact with heater core 944 such that the back airflow 991 is heated as it flows from rear hot air passage 948 to front hot air passage 946. Back airflow 991 can flow through partition 990 due to inadequate sealing between partition 990 and heater core 944 while also flowing through the various flow passages through heater core 944. As a result, hot back airflow 991 flows into front main passage 950 and mixes with the cold air being provided thereto from main air supply passage 954. The resulting conditioned air in front main passage 950 thereby does not have the desired conditioning and, rather, is altered due to the presence of heated back airflow 991. This back airflow 991 thereby alters the operation of the HVAC module such that a desired flow of conditioned air may not be realized and/or operation of the controls does not produce a desired result when a cooling mode is requested.

Figure 4A:
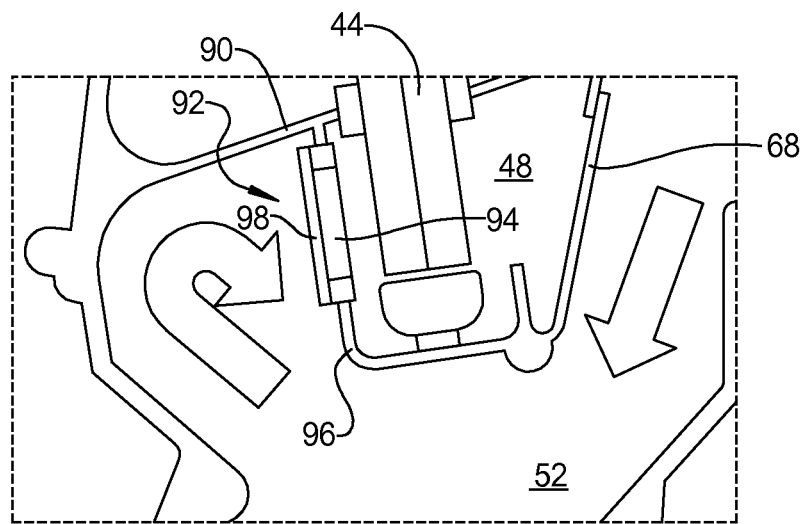
FIGS. 4A and 4B are enlarged views of the boxed area of FIG. 3 showing the operation of the air valve when in a full cold mode and full hot mode, respectively, according to the present teachings.
Figure 4B:
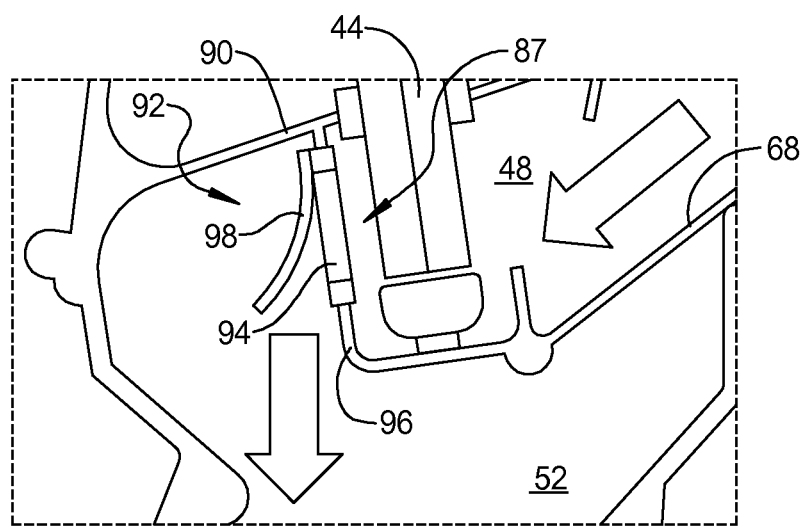

Referring to FIGS. 3, 4A, and 4B, HVAC module 22 includes an air valve 92 to reduce and/or eliminate the back airflow. Air valve 92 functions as a one-way valve or check valve that allows one-directional airflow through rear hot air passage 48 and the portion of heater core 44 therein. As shown in FIG. 4A, when a full cold mode is requested, rear air mix door 68 prevents direct flow from main air supply passage 54 into rear hot air passage 48. As a result, the airflow for rear passenger space 24b will flow directly from main air supply passage 54 into rear main passage 52. Air valve 92 prevents a back airflow from entering into rear hot air passage 48. In contrast, when a full hot mode is selected, as shown in FIG. 4b, rear air mix door 68 blocks direct flow from main air supply passage 54 to rear main passage 52 and, rather, directs the airflow for rear passenger space 24b directly from main air supply passage 54 into rear hot air passage 48. Air valve 92 allows the air to flow through rear hot air passage 48 and heater core 44 and into rear main passage 52 for subsequent flowing to rear passenger space 24b. Air valve 92 thereby functions as a one-way valve that allows air to flow through rear hot air passage 48 and into main air supply passage 54 when directed into rear hot air passage 48 by rear air mix door 68. Air valve 92 also prevents back airflow into rear hot air passage 48 when rear air mix door 68 does not allow direct flow from main air supply passage 54 into rear hot air passage 48. As a result, use of air valve 92 can eliminate and/or minimize the possibility of a back airflow from rear hot air passage 48 into front air hot passage 46 discussed above.

Figure 5:
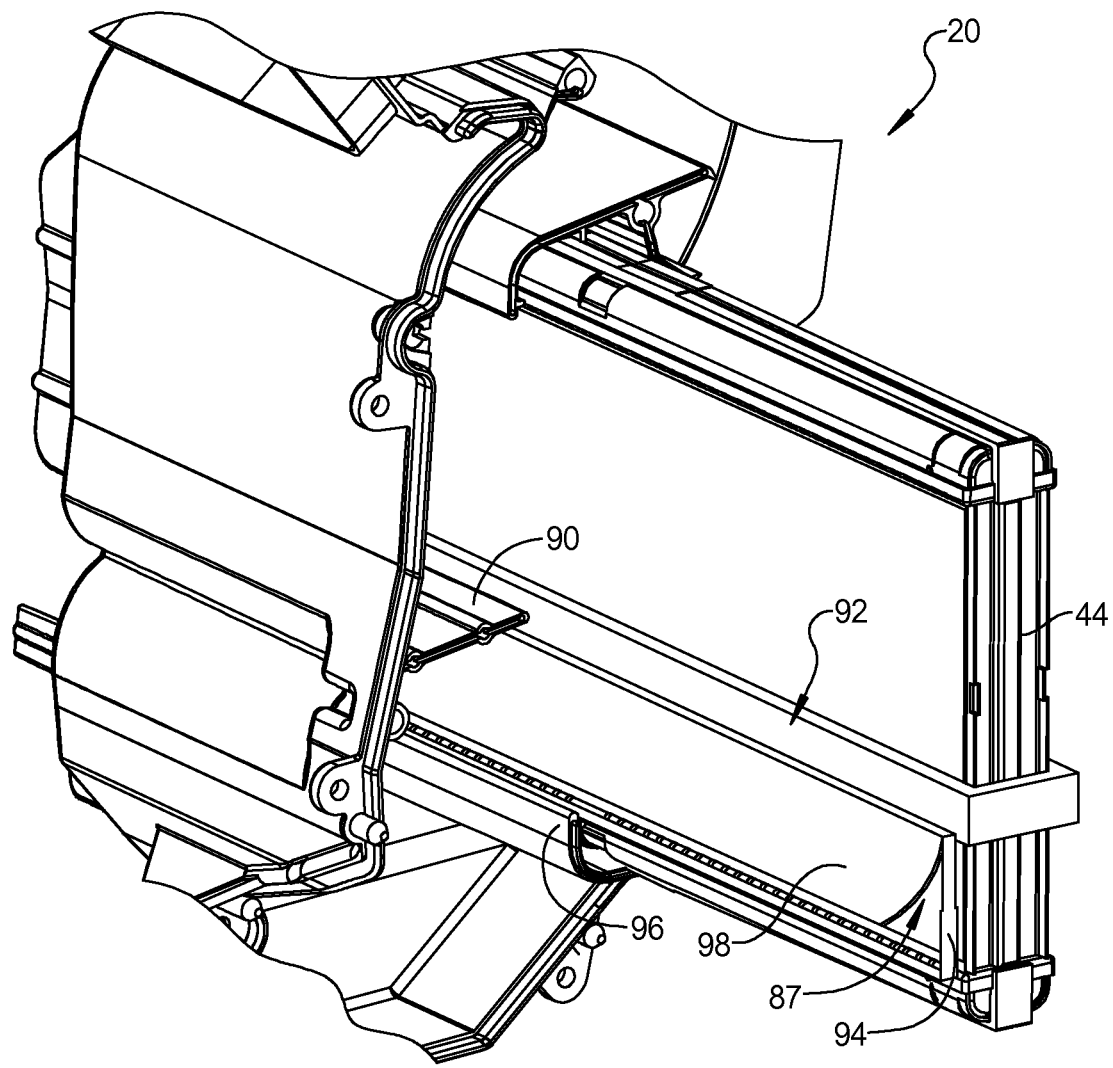
FIG. 5 is an enlarged fragmented perspective view of the driver case, heater core and a first embodiment of an air valve according to the present teachings.

Air valve 92 can take a variety of forms to provide the described functionality. Referring to FIG. 5, a first embodiment of air valve 92 is shown. Air valve 92 includes a removable rigid frame 94 that defines an opening 87 therethrough. Frame 94 is dimensioned to fit along the downstream side of heater core 44 in rear hot air passage 48. Frame 94 extends from partition 90 to the lower partition 96 of rear hot air passage 48. A flexible flap 98 is attached to the upper portion of frame 94 and can cover opening 87 in a closed position. Flap 98 can seal against frame 94 when in the closed position. Flap 98 can be attached to frame 94 with adhesive, by way of non-limiting example. Flap 98 can be resilient and is normally in the closed position, such as shown in FIG. 4A. However, when a flow of air through rear hot air passage 48 is provided by the position of rear air mix door 68, the flow through rear hot air passage 48 dislodges flap 98 from the closed position to allow the air to flow from rear hot air passage 48 into rear main passage 52, as shown in FIG. 4B. When the flow through rear hot air passage 48 ceases, such as when blower 86 is not operating or when rear air mix door 68 blocks flow into rear hot air passage 48, flap 98 returns to its closed position, such as that shown in FIG. 4A. In this manner, air valve 92 provides a check valve function or a one-way flow function. Frame 94 can be made from plastic, by way of non-limiting example. Flap 98 can be an elastomeric material, such as rubber, by way of non-limiting example. The resilient shape of flap 98 and/or gravity can cause flap 98 to be biased to the closed position. The pressure differential that causes the back airflow can help close flap 98 against frame 94.

Referring now to FIGS. 6, 7A, and 7B, a second embodiment of an air valve according to the present teachings is shown. In this embodiment, air valve 192 includes a rigid frame 194 and a rigid door 195. Frame 194 is similar to frame 94 discussed above. Door 195 is attached to the upper edge of frame 194 by a hinge 185. In some configurations, door 195 is attached to frame 194 with a living hinge, as shown in FIG. 7A, and frame 194 and door 195 may be a single integral component of the same material. In other configurations, a rubber or other elastomeric hinge member 185 may interconnect door 195 with frame 194 to provide a hinge function, as shown in FIG. 7B. Door 195 is biased to a closed position by gravity and/or the resilient shape of hinge 185. In some configurations, a spring may be utilized to bias door 195 to the closed position. Air valve 192 functions in the same manner discussed above with reference to air valve 92. As such, a further description of the operation of air valve 192 is not provided.

Figure 8:
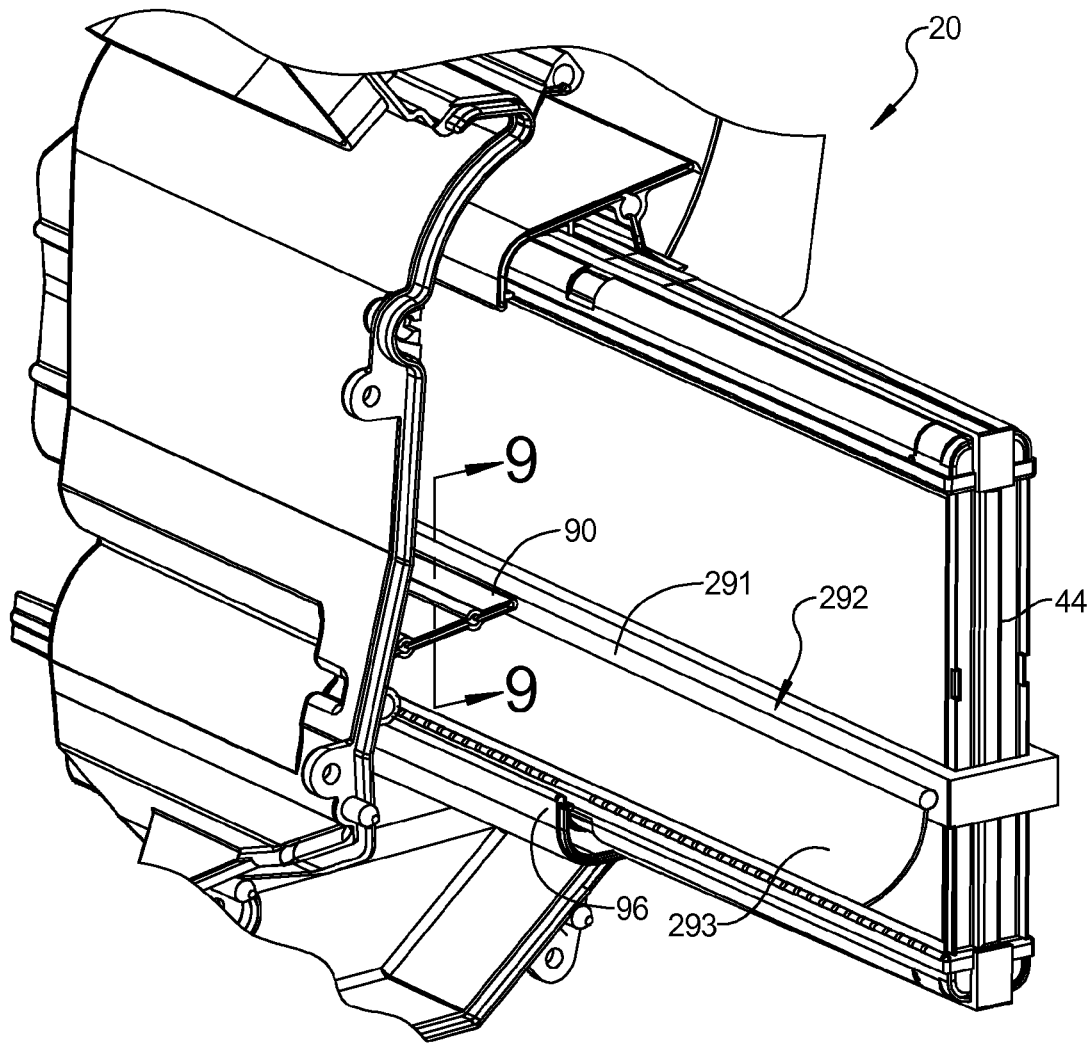
FIG. 8 is an enlarged fragmented perspective view of the driver case, heater core and a third embodiment of an air valve according to the present teachings.
Figure 9:
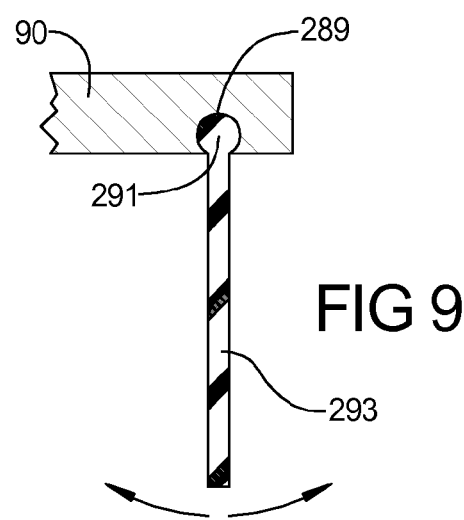
FIG. 9 is an enlarged fragmented cross-sectional view along line 9-9 of FIG. 8.

Referring now to FIGS. 8 and 9, another embodiment of an air valve according to the present teachings is shown. Air valve 292 is a single one-piece construction and does not utilize a frame. Rather, air valve 292 is configured to be attached to a complementary recess in partition 90. Specifically, air valve 292 includes a flexible flap 293 with an upper engaging feature 291. In the configuration shown, engaging feature 291 is generally cylindrical with flap 293 extending therefrom. Partition 290 includes a complementary recess 289 that extends the length of heater core 44. Recess 289 is circular in cross-section with a gap that allows air valve 292 to be positioned in recess 289 with flap 293 extending therefrom. The circular nature of recess 289 maintains air valve 292 in position within HVAC module 22. Recess 289 may allow for some relative rotation of engaging feature 291 therein due to the flow of conditioned air through rear hot air passage 48. As discussed above with reference to air valve 92, flap 293 can be biased to a closed position, preventing backflow through rear air hot passage 48 by gravity and/or the resilient shape of flap 293. Air valve 292 can be made from an elastomeric material, such as rubber, by way of non-limiting example. Air valve 292 can be attached to driver and passenger cases 38, 40 by sliding engaging feature 291 into recess 289. In this embodiment, flap 293 can press directly against heater core 44, when closed, due to the lack of a frame and seal thereagainst. Operation of air valve 292 is similar to that discussed above with reference to air valve 92. As such, further operation of air valve 292 is not discussed.

Referring now to FIGS. 10, 11A, and 11B, a fourth embodiment of an air valve according to the present teachings is shown. Air valve 392 is similar to air valve 292 in that it utilizes an engaging feature 391 that is cylindrical in nature and generally circular in cross-section that fits within a complementary recess 389 in partition 390. Engaging feature 391 is integral with a rigid door 397 such that door 397 and engaging feature 391 are a single integral piece. A living hinge 385, as shown in FIG. 11A, can couple door 397 to engaging feature 391 and allow door 397 to move between open and closed positions with the air flowing through rear hot air passage 48. Gravity and/or the resilient nature of living hinge 399 can bias door 397 to the closed position. In some configurations, as shown in FIG. 11B, engaging feature 391 may be capable of relative rotation within recess 389. When this is the case, the use of a living hinge is not required as door 397 can move with rotation of engaging feature 391 within recess 389. Gravity can bias door 397 to the closed position. In some configurations, a spring may be utilized to bias door 397 to the closed position. As discussed above with reference to air valve 292, door 397 can seal against heater core 44.

Thus, an HVAC module 22 according to the present teachings can utilize an air valve 92, 192, 292, 392 to reduce and/or prevent back airflow from rear hot air passage 48 into front hot air passage 46 and front main passage 50. The use of an air valve 92, 192, 292, 392 can provide a passive device that is normally closed and can open to allow one-way flow through rear hot air passage 48. The use of a passive air valve 92, 192, 292, 392 accomplishes the reduction and/or prevention of the back airflow without requiring mechanically actuated linkages or mechanisms which can increase the cost or complexity of HVAC module 22. It should be appreciated that air valve 92, 192, 292, 392 does not need to provide a fluid-tight seal to entirely prevent all back airflow. Rather, air valve 92, 192, 292, 392 can minimize or inhibit the possibility of back airflow, while possibly allowing some back airflow, and still be effective in improving the performance of HVAC module 22 and HVAC system 21. Furthermore, air valve 92, 192, 292, 392 can also be used in conjunction with a seal, such as foam that can provide additional sealing between heater core 44 and partition 90. However, such seal will not impact the back airflow of air through the heater core itself and the passages therein. Thus, an air valve 92, 192, 292, 392 according to the present teachings can advantageously provide an economical way to reduce the possibility of back airflow occurring that impacts the performance of HVAC module 22 and HVAC system 21. Moreover, it should be appreciated that an air valve according to the present teachings can be utilized in HVAC modules that are a single zone, dual zone, triple zone, and the like. Additionally, an air valve according to the present teachings can be utilized in an HVAC module wherein flow is desired to be restricted to a single direction. Furthermore, an air valve according to the present teachings can be utilized in an HVAC module in locations that do not include a heat exchanger.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An HVAC module comprising:
   a housing;
   an air supply passage in the housing;
   a blower operable to supply an air flow to the air supply passage;
   an outlet passage in the housing;
   a conditioning passage in the housing in flow communication with the air supply passage and the outlet passage;
   a heat exchanger supported in the housing by a partition wall of the housing;
   an actively controlled door operable to selectively block flow communication between the air supply passage and the conditioning passage; and
   a passive air valve having an open position allowing air to flow through the conditioning passage and the heat exchanger when originating from the air supply passage and a closed position inhibiting air from flowing through the conditioning passage and the heat exchanger when originating from the outlet passage; wherein
   the passive air valve is in the open position during a heating mode of the HVAC module and is in the closed position during a cooling mode of the HVAC module.

2. The HVAC module of claim 1, wherein the passive air valve is a check valve.

3. The HVAC module of claim 1, wherein the heat exchanger is a heater core.

4. The HVAC module of claim 1, wherein the passive air valve is disposed immediately adjacent the heat exchanger.

5. The HVAC module of claim 1, wherein the passive air valve includes a passively moveable member movable from a first position allowing air to flow through the conditioning passage when originating from the air supply passage and a second position inhibiting air from flowing through the conditioning passage when originating from the outlet passage, the moveable member moving from the second position to the first position under the influence of an air flow in the conditioning passage that originates from the air supply passage.

6. The HVAC module of claim 5, wherein the moveable member is biased to the second position.

7. The HVAC module of claim 5, wherein the moveable member is a resilient flexible flap.

8. The HVAC module of claim 7, wherein the flap at least partially seals against a frame attached to the partition wall when in the second position and moves at least partially away from the frame when in the first position.

9. The HVAC module of claim 7, wherein the flap includes an engaging feature along an edge thereof, the conditioning passage includes a complimentary recess extending along a top portion thereof, and the engaging feature of the flap is disposed in the recess and retains the flap in the conditioning passage.

10. The HVAC module of claim 7, wherein the air valve includes a rigid frame with an opening therethrough, the frame is disposed in the conditioning passage, the flap is attached to the frame and covers the opening in the frame and at least partially seals against the frame when in the second position and moves at least partially away from the frame when in the first position.

11. The HVAC module of claim 5, wherein the moveable member is rigid door that swings between the first and second positions.

12. The HVAC module of claim 11, wherein the door at least partially seals against the heat exchanger when in the second position and moves at least partially away from the heat exchanger when in the first position.

13. The HVAC module of claim 11, wherein the door includes an engaging feature along an edge thereof, the conditioning passage includes a complimentary recess extending along a top portion thereof, and the engaging feature of the door is disposed in the recess and retains the door in the conditioning passage.

14. The HVAC module of claim 11, wherein the air valve includes a rigid frame with an opening therethrough, the frame is disposed in the conditioning passage, the door is attached to the frame and covers the opening in the frame and at least partially seals against the frame when in the second position and moves at least partially away from the frame when in the first position.

15. The HVAC module of claim 1, wherein:
the air supply passage includes a main air supply passage;
the outlet passage includes a first outlet passage, a second outlet passage, at least one first outlet communicating with the first outlet passage for directing a first conditioned flow of air to a first location and at least one second outlet communicating with the second outlet passage for directing a second conditioned flow of air to a second location different than the first location;
the conditioning passage includes a first conditioning passage extending between the main air supply and the first outlet passage and a second conditioning passage extending between the main air supply passage and the second outlet passage;
the heat exchanger includes a heater core disposed in the housing and extending through both of the first and second conditioning passages;
the actively controlled door includes a first actively controlled door operable to selectively block flow communication between the main air supply passage and the first conditioning passage and a second actively controlled door operable to selectively block flow communication between the main air supply passage and the second conditioning passage; and
the passive air valve is disposed in the second conditioning passage on an opposite side of the heater core from the second actively controlled door, the passive air valve allowing air to flow through the heater core in the second conditioning passage when originating from the main air supply passage and inhibiting air flow through the second conditioning passage when originating from the second outlet passage, the passive air valve thereby inhibiting back airflow from the second conditioning passage to the first conditioning passage when the first and second actively controlled doors block flow communication between the respective first and second conditioning passages and the main air supply passage.

16. The HVAC module of claim 15, wherein the passive air valve includes a passively moveable member movable from a first position allowing air to flow through the second conditioning passage when originating from the main air supply passage and a second position inhibiting air from flowing through the second conditioning passage when originating from the second outlet passage, the moveable member moving from the second position to the first position under the influence of an air flow in the second conditioning passage that originates from the main air supply passage, the moveable member being biased to the second position.

17. The HVAC module of claim 16, wherein the moveable member is a resilient flexible flap that at least partially seals against the heater core when in the second position and moves at least partially away from the heater core when in the first position, and the flap includes an engaging feature along an edge thereof, the second conditioning passage includes a complimentary recess extending along a top portion thereof, and the engaging feature of the flap is disposed in the recess and retains the flap in the second conditioning passage.

18. The HVAC module of claim 16, wherein the air valve includes a rigid frame with an opening therethrough, the frame is disposed in the second conditioning passage, the moveable member is a resilient flexible flap attached to the frame and covers the opening in the frame and at least partially seals against the frame when in the second position and moves at least partially away from the frame when in the first position.

19. The HVAC module of claim 16, wherein the moveable member is rigid door that swings between the first and second positions and at least partially seals against the heater core when in the second position and moves at least partially away from the heater core when in the first position, the door includes an engaging feature along an edge thereof, the second conditioning passage includes a complimentary recess extending along a top portion thereof, and the engaging feature of the door is disposed in the recess and retains the door in the second conditioning passage.

20. The HVAC module of claim 16, wherein the air valve includes a rigid frame with an opening therethrough, the frame is disposed in the second conditioning passage, the moveable member is rigid door that swings between the first and second positions and is attached to the frame and covers the opening in the frame and at least partially seals against the frame when in the second position and moves at least partially away from the frame when in the first position.

* * * * *